United States Patent
Lieven et al.

(10) Patent No.: US 9,611,039 B2
(45) Date of Patent: Apr. 4, 2017

(54) AIRCRAFT INCLUDING A PASSENGER CABIN EXTENDING AROUND A SPACE DEFINED OUTSIDE THE CABIN AND INSIDE THE AIRCRAFT

(71) Applicant: AIRBUS OPERATIONS (S.A.S.), Toulouse (FR)

(72) Inventors: Patrick Lieven, Fronton (FR); Romain Delahaye, Colomiers (FR); Catalin Perju, Saint-Loup-Cammas (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/263,376

(22) Filed: Apr. 28, 2014

(65) Prior Publication Data

US 2014/0319274 A1    Oct. 30, 2014

(30) Foreign Application Priority Data

Apr. 29, 2013 (FR) ..................................... 13 53901

(51) Int. Cl.
*B64D 11/00* (2006.01)
*B64D 9/00* (2006.01)
(Continued)

(52) U.S. Cl.
CPC .............. *B64D 11/00* (2013.01); *B64C 1/00* (2013.01); *B64D 9/00* (2013.01); *B64C 2001/0045* (2013.01); *B64C 2039/105* (2013.01)

(58) Field of Classification Search
CPC ......... B64C 1/00; B64C 39/00; B64C 39/001; B64C 39/04; B64C 39/06; B64C 39/062;
(Continued)

(56) References Cited

U.S. PATENT DOCUMENTS 2,876,964 A * 3/1959 Streib ................... B64C 39/064
                                                       244/12.2
3,343,768 A * 9/1967 Gartzke ................. B64C 39/06
                                                       244/130

(Continued)

FOREIGN PATENT DOCUMENTS

DE          14 81 622          1/1970

OTHER PUBLICATIONS

French Search Report for Application No. FR 1353901 dated Dec. 16, 2013.

*Primary Examiner* — Philip J Bonzell
(74) *Attorney, Agent, or Firm* — Jenkins, Wilson, Taylor & Hunt, P.A.

(57) ABSTRACT

The sealed bottoms of aircraft passenger cabin have to be fastened with heavily sized fasteners so as to withstand loads induced by the cabin pressurization. Besides, the increase in aircrafts seating capacity makes an increase in passenger cabin widths of interest. Such a width increase however makes the structure delimiting passenger cabin less resistant to efforts induced by the cabin pressurization. The present invention proposes an aircraft wherein the structure delimiting passenger cabin extends over 360 degrees around a space defined outside structure. The invention allows structure to be more resistant to loads induced by the cabin pressurization, while allowing to reduce or even to avoid the need for a sealed bottom, and while allowing to increase the space available for passengers.

11 Claims, 8 Drawing Sheets

(51) Int. Cl.
*B64C 1/00* (2006.01)
*B64C 39/10* (2006.01)

(58) Field of Classification Search
CPC .......... B64C 39/068; B64C 2001/0045; B64C 2039/00; B64C 2039/105
See application file for complete search history.

(56) References Cited

U.S. PATENT DOCUMENTS

| | | | |
|---|---|---|---|
| 3,405,893 A | | 10/1968 | Flamand et al. |
| 3,484,060 A | * | 12/1969 | Trupp ................... B64C 39/001 |
| | | | 244/12.2 |
| 3,689,011 A | * | 9/1972 | Torelli ................... B64C 39/06 |
| | | | 244/12.2 |
| 4,050,652 A | * | 9/1977 | DeToia ................ B64C 39/001 |
| | | | 244/12.2 |
| 4,196,877 A | * | 4/1980 | Mutrux ................... B64C 39/06 |
| | | | 244/12.2 |
| 4,606,515 A | * | 8/1986 | Hickey ..................... B64B 1/26 |
| | | | 244/23 C |
| 5,039,031 A | * | 8/1991 | Valverde ............... B64C 39/001 |
| | | | 244/12.2 |
| 5,149,012 A | * | 9/1992 | Valverde ............... B64C 39/001 |
| | | | 244/12.2 |
| 6,113,029 A | * | 9/2000 | Salinas ............... B64C 29/0016 |
| | | | 244/12.6 |
| 6,666,406 B2 | * | 12/2003 | Sankrithi ................ B64C 39/04 |
| | | | 244/119 |
| 2004/0129836 A1 | | 7/2004 | Seidel |
| 2012/0160968 A1 | | 6/2012 | Barmichev |
| 2014/0151494 A1 | * | 6/2014 | Cvrlje ................ B64C 29/0025 |
| | | | 244/6 |

* cited by examiner

AIRCRAFT INCLUDING A PASSENGER CABIN EXTENDING AROUND A SPACE DEFINED OUTSIDE THE CABIN AND INSIDE THE AIRCRAFT

TECHNICAL FIELD

This invention relates to the field of aircraft and applies particularly to the configuration of a structure delimiting a passenger cabin in an aircraft.

BACKGROUND

The cabin to be used by passengers of an aircraft defines a pressurised space that can also contain the pilot's cabin or the cockpit.

The level of loads induced by pressurisation is taken into account in the design of an aircraft and has a special influence on the design of the structure delimiting the cabin that must withstand these loads.

The capability of a structure to resist such loads depends particularly on the geometry of this structure.

The approximately cylindrical geometry of the structure delimiting the passenger cabin in conventional aircraft is particularly favourable for resistance to pressurisation loads.

However, a structure of this type has to be closed by sealed bottoms that are inherently more sensitive to pressurisation loads, at its two longitudinal ends. Consequently the means for fastening these bottoms onto the structure have to be conservatively designed.

Furthermore, an approximately cylindrical geometry limits possibilities for increasing the passenger carrying capacity of aircraft.

Conversely, a wide cabin geometry provides a greater carrying capacity, but does not have such a good natural capability of resisting pressurisation loads. Under pressurisation loads, such a structure tends to move back into an almost circular shape. The term "wide" geometry refers to a structure in which the dimension along the transverse direction of the aircraft is larger than its extent along the vertical direction of the aircraft. The less good capability of the structure to resist pressurisation loads then makes necessary to increase the mass of the structure and/or use stronger but usually more expensive materials.

SUMMARY

The purpose of the invention is particularly to provide a simple, economic and efficient solution to these problems, to at least partially overcome the above-mentioned disadvantages.

To achieve this, the invention discloses an aircraft comprising a structure delimiting a passenger cabin.

According to the invention, when the structure is seen from above, it includes:
- at least two lateral portions respectively delimiting two lateral regions of the passenger cabin and separated from each other by a space defined outside the structure and delimited by lower and upper fairings inscribed in an aerodynamic envelope externally delimiting the aircraft;
- a forward portion connecting two forward ends of the lateral portions of the structure to each other; and
- an aft portion connecting two aft ends of the lateral portions of the structure to each other.

Obviously, the passenger cabin forms a pressurised space during flight. On the other hand, since the above-mentioned space is defined outside the structure delimiting the passenger cabin, this space is not pressurised during flight.

Indeed, the presence of the space defined outside the structure and surrounded by it inside the aircraft, enables better distribution of pressurisation loads applied to the structure and thus makes this structure more capable of resisting these pressurisation loads.

The presence of the above-mentioned space induces a subdivision of the structure into portions arranged on each side of this space.

Thus, for each of the forward and aft portions of the structure, the ratio between the extent along a longitudinal direction of the aircraft and the extent along a direction of the height is thus less than the ratio between the longitudinal extent and the extent along the height of passenger structures in conventional aircraft or flying wings.

Similarly, for each of the two lateral portions, the ratio between the extent along a transverse direction of the aircraft and the extent along the height may also be less than the ratio between the transverse extent and extent along the height of structures of passenger cabins in conventional aircraft.

In one preferred embodiment of the invention, when the structure is seen from above, the forward portion of the structure has an outside edge that is concave from a first end as far as a second end opposite of the forward portion, the concave face of the outside edge facing the aft of the aircraft.

Preferably, the aerodynamic envelope comprises at least one access hatch for accessing the space.

Preferably, the structure comprises at least one internal door for accessing the space.

Preferably, the aircraft also comprises a removable container housed inside the space.

Preferably, the aircraft also comprises a landing gear housed inside the space.

In one preferred embodiment of the invention, each of the lateral portions of the structure comprises a plurality of circumferential stiffening frames.

Each of the forward and aft portions advantageously comprises a plurality of circumferential stiffening frames.

Preferably, the circumferential stiffening frames of the structure lie in corresponding planes and are arranged such that when the structure is seen from above and following the anticlockwise direction, the plane of each of the circumferential stiffening frames defines a positive or zero anticlockwise angle with the plane of the previous circumferential stiffening frame.

In one preferred embodiment of the invention, the aft portion of the structure itself comprises one median portion and two lateral portions arranged on each side of the median portion so as to define two other spaces outside the structure, extending between the median portion and the lateral portions of the aft portion respectively, and each delimited by the lower and upper parts of the aerodynamic envelope.

The invention also relates to a method for embarking or disembarking passengers in an aircraft of the type described above, including the passage of passengers through the access hatch of the aerodynamic envelope, through the space and through the inside door of the structure.

BRIEF DESCRIPTION OF THE DRAWINGS

The invention will be better understood and other details, advantages and characteristics of it will become clear after reading the following description provided as a non-limitative example with reference to the appended drawings in which:

FIG. 3 is a partial diagrammatic sectional view of the aircraft in FIG. 1, along plane III-III in FIGS. 1 and 1a;

FIG. 4 is a partial diagrammatic sectional view of the aircraft in FIG. 1, along plane IV-IV in FIGS. 1 and 1a;

Identical references in all these figures may denote identical or similar elements.

DETAILED DESCRIPTION

Figure 1:
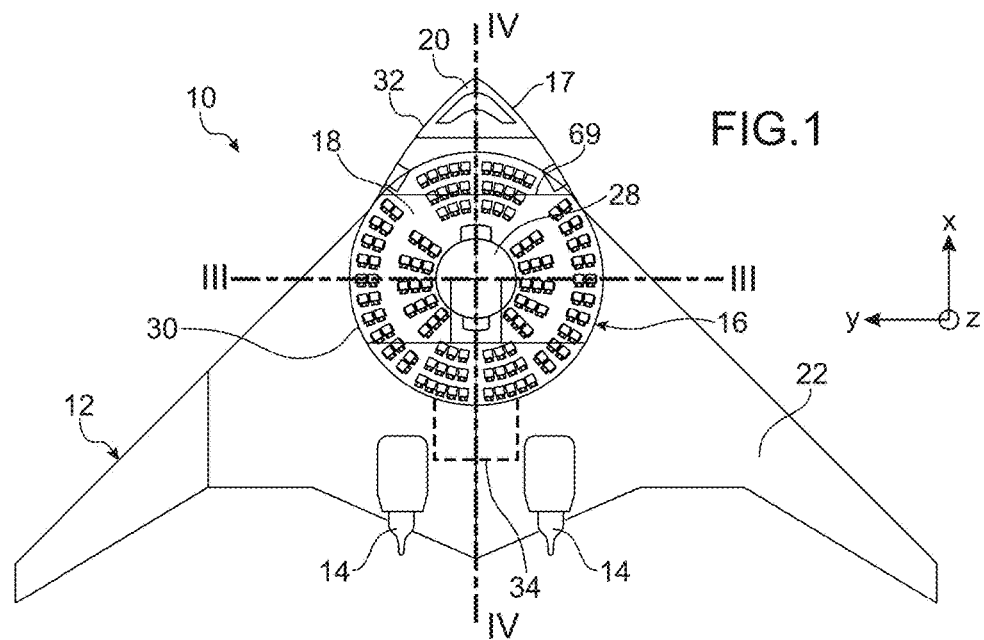
FIG. 1 shows a diagrammatic top view of an aircraft according to a first embodiment of the invention.

FIGS. 1 to 4 describe an aircraft 10 according to a first embodiment of the invention. In this embodiment, the aircraft is a flying wing. Consequently, the passenger cabin is integrated into the aircraft wing 12.

Throughout the remaining description, X refers to the longitudinal direction of the aircraft 10 along the direction of advance of the aircraft, Z is the direction of the height of the aircraft corresponding approximately to the vertical direction when the aircraft 10 is on the ground, and Y is the transverse direction of the aircraft 10 that is orthogonal to the two previous directions X and Z.

The aircraft 10 globally comprises the wing 12 and, for example two turbo engines 14 mounted above the wing.

The aircraft 10 integrates a structure 16 delimiting a passenger cabin 18 and a pilot's cabin or cockpit 20. This structure 16 comprises principally a skin 17 stiffened by stiffeners and frames in a manner similar to fuselages of conventional aircraft as will become clear from the following description.

The space delimited by the structure 16 and forming the passenger cabin 18 and the cockpit 20 will be pressurised in flight, in a manner known in itself. Consequently, the aircraft comprises pressurisation means that may be of conventional type.

The aircraft comprises an aerodynamic envelope 22 delimiting the outside of the aircraft and that can be formed of a continuous skin or made of adjacent panels that may or may not perform a structural function.

Figure 3:
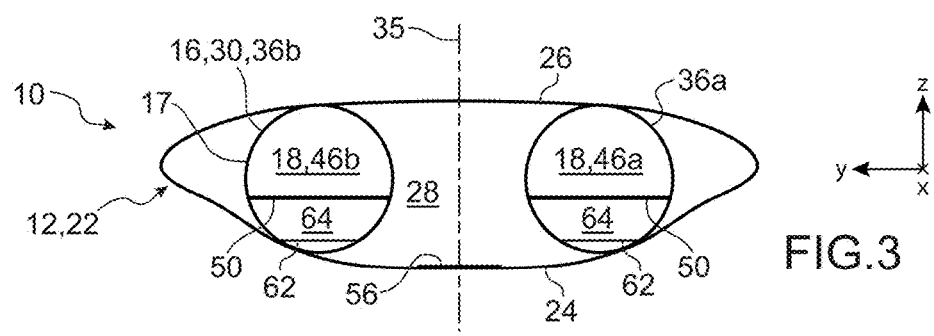
Figure 4:
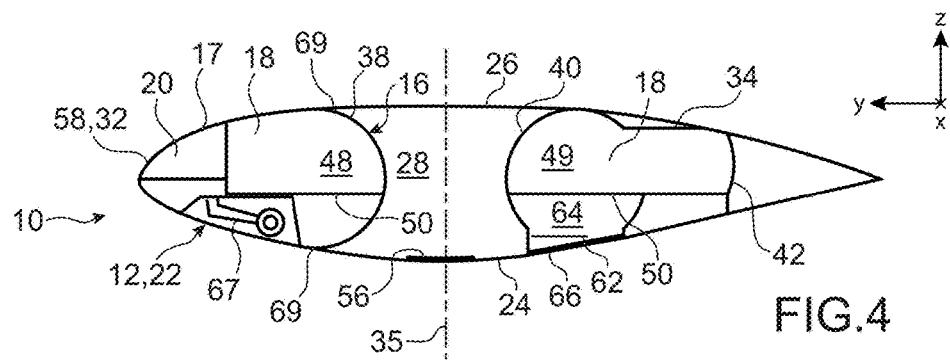

This aerodynamic envelope 22 comprises a lower part 24 defined on a lower side of the aircraft, and an upper part 26 defined on a upper side of the aircraft (FIGS. 3 and 4).

Figure 1A:
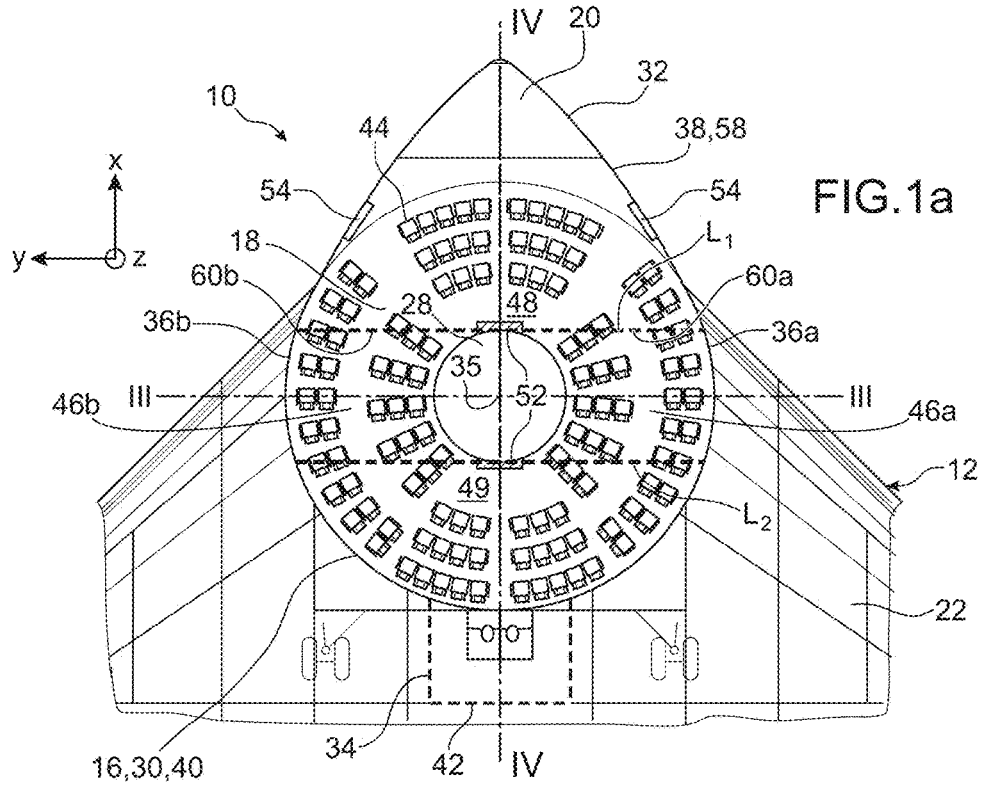
FIG. 1a is a larger scale view of the aircraft in FIG. 1, in a sectional view through a horizontal plane, illustrating a structure delimiting the passenger cabin.
Figure 2:
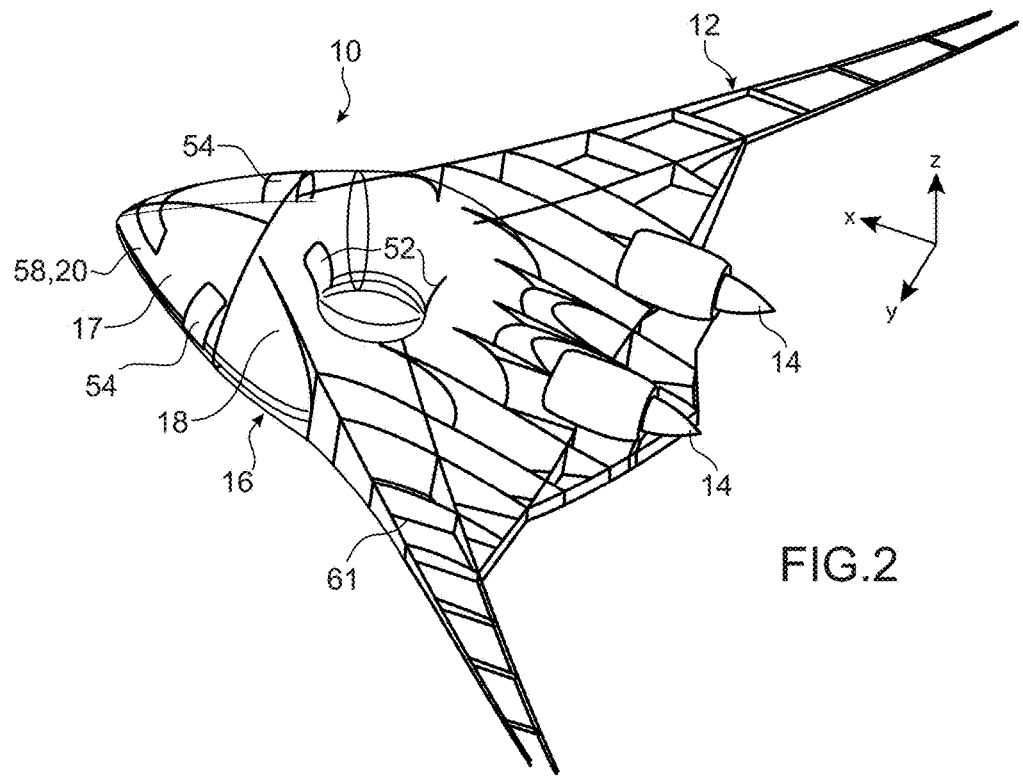
FIG. 2 is a diagrammatic perspective view of the aircraft in FIG. 1 without part of its aerodynamic envelope.

As can be seen in FIGS. 1, 1a and 2, the structure 16 is generally in the form of a torus. Thus, the structure 16 surrounds a space 28 defined outside the structure 16, around 360 degrees, the space 28 extending between the lower part 24 and the upper part 26 of the aerodynamic envelope 22.

Since the space 28 is defined outside the structure 26, this space 28 will remain unpressurised during flight.

More precisely, the structure 16 comprises a generally toroidal part 30 that prolongs forwards to form a nose cone 32 of the aircraft integrating the cockpit 20 (FIG. 1a). In the example shown, the toroidal part 30 also extends in the aft direction by a projection 34 that houses various equipment for the crew and/or toilets for passengers. The toroidal part 30 preferably has an approximately circular cross-section along the radial direction defined about the axis 35 of the toroidal part as can be seen in FIG. 3.

The structure 16 may be subdivided virtually by two dashed lines L1 and L2 (FIG. 1a), so as to define two lateral portions 36a and 36b connected to each other through a forward portion 38 and through an aft portion 40. The lines L1 and L2 extend transversely and are approximately tangent to a forward end and an aft end respectively of the space 28.

The presence of the space 28 defined outside the structure 16 and surrounded by it inside the aircraft 10, enables a better distribution of pressurisation loads applied to the structure 16, and thus gives this structure 16 a better ability to resist these pressurisation loads. The presence of the space 28 induces a subdivision of the structure 16 into parts arranged on each side of the space 28. The ratio between the extent along the longitudinal direction X and the extent along the direction of the height Z for the forward portion 38 and the aft portion 40 is thus less than the ratio between the longitudinal extent and the extent along the height of passenger cabin structures in conventional aircraft or flying wings. Similarly, as regards each of the lateral portions 36a and 36b, the ratio between the extent along the transverse direction Y and the extent along the direction of the height Z is less than the ratio between the transverse extent and the extent along the height of the structures of passenger cabins in conventional aircraft.

The approximately circular geometry of the section of the toroidal part 30 of the structure 16 further increases the resistance to pressurisation loads. The structure 16 is approximately equivalent to a cylindrical structure with a circular cross-section closed on itself, which can reduce or even eliminate the need for sealed bottoms. In the example shown, only the projection 34 requires a sealed bottom 42 (FIG. 1a), which is nevertheless limited in extent in comparison with sealed bottoms of conventional aircraft fuselages. As will become clearer in the following, the structure 16 does not necessarily have a projection in the aft direction in other embodiments of the invention, and therefore does not need a sealed bottom.

The approximately toroidal geometry of the structure 16 makes it possible for this structure to efficiently participate in stiffening the aircraft assembly 10, particularly with regard to bending loads applied to the wing 12 in the transverse plane. Once again, the result is saving in terms of design of the overall structure of the aircraft 10.

As can be seen in FIG. 1a, the passenger cabin 18 comprises passenger seats 44 that are for example arranged radially in side regions 46a, 46b of the passenger cabin 18 and circumferentially in the forward 48 and aft 49 regions of this passenger cabin. These seats 44 are installed on a main floor 50 (FIGS. 3 et 4) of the passenger cabin 18.

Furthermore, the structure 16 includes for example two inside doors 52 that open up into the space 28 and two outside doors 54 that open up outside the aircraft 10 (FIGS. 1a and 2). The two inside doors 52 are for example arranged at the front and the back of the space 28 respectively, while the two outside doors 54 are for example arranged on each side of the forward portion 38 of the structure 16.

Furthermore, the lower part 24 of the aerodynamic envelope 22 preferably includes an access hatch 56 visible in FIGS. 3 and 4 providing communication between the space 28 and the outside of the aircraft 10. For example, the hatch 56 includes two hinged shutters that can pivot about 180 degrees between an open position and a closed position.

Since the space 28 is not pressurised, the access hatch 56 is not subjected to pressurisation loads, such that the access hatch 56 and the means of locking the access hatch may be relatively light.

Note that when seen from above (FIG. 1a), the forward portion 38 of the structure 16 has an outside edge 58 that is concave from a first end 60a as far as a second opposite end 60b of the forward portion 38, with its concavity oriented towards the aft of the aircraft 10. The two ends 60a and 60b of the forward portion 38 are defined at the virtual line L1 separating the forward portion 38 from each of the lateral portions 36a, 36b of the structure 16.

The concave shape of the outside edge 58 of the forward portion 38 of the structure 16 has the advantage that it prevents the presence of inflections, also called "double curvatures", which optimises the strength of this forward portion 38 to resist pressurisation loads.

Furthermore, FIG. 2 shows the aircraft 10 without an aft portion of the aerodynamic envelope 22, showing longitudinal ribs 61 (shown very diagrammatically) designed to stiffen the part of the aircraft located aft of the structure 16 delimiting the passenger cabin. Some of these ribs have a forward end connected to the structure 16. To achieve this, the forward end advantageously has a curved shape complementary to the section of the structure 16.

Furthermore, FIGS. 3 and 4 give a view of a secondary floor 62 arranged under the main floor 50 at the lateral portions 36a, 36b and the aft portion 40 of the structure 16. This secondary floor 62 delimits a hold 64 for transport of luggage and/or freight. This hold is accessible through a hold door 66 integrated in the lower part 24 of the aerodynamic envelope 22 (FIG. 4). The secondary floor 62 advantageously comprises an opening facing the hold door 66 to allow the passage of luggage or freight, and preferably integrates a conveying system, in a manner known in itself.

FIG. 4 also gives a view of the forward landing gear compartment 67 that, in the example shown, is integrated into the forward portion 38 of the structure 16 below the floor 50.

The aircraft 10 also comprises two aft landing gear compartments that are not shown in FIGS. 1 to 4 and that are located in the aft part of the structure 16.

In the particular example shown, the aerodynamic envelope 22 comprises a forward portion formed directly by the skin 17 of the structure 16, and an aft portion 69 (FIG. 1) composed of a skin or adjacent panels and extending particularly around part of the structure 16.

Figure 5:
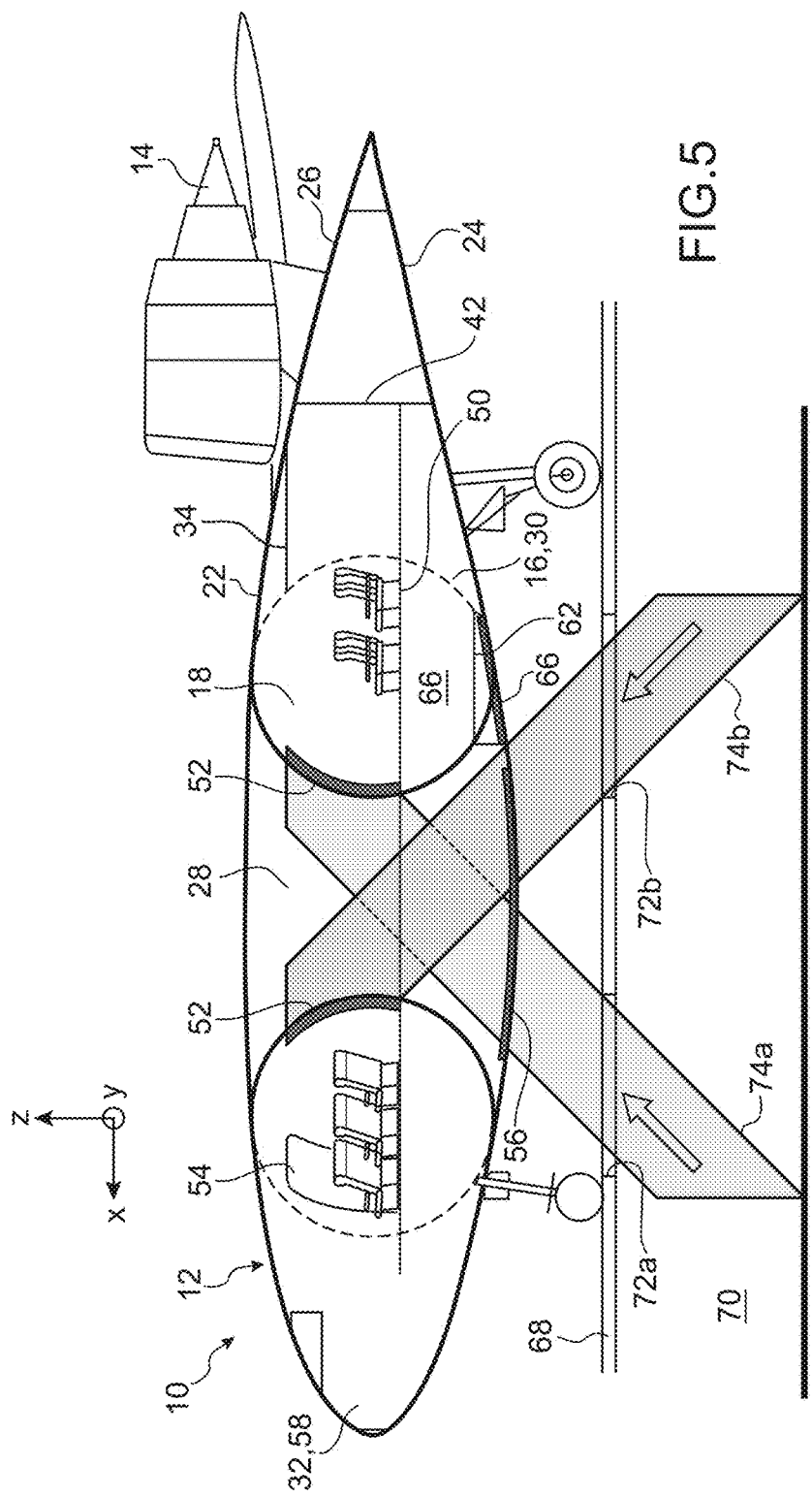
FIG. 5 is a diagrammatic longitudinal sectional view of the aircraft in FIG. 1, showing a first passenger embarking and disembarking method.
Figure 6:
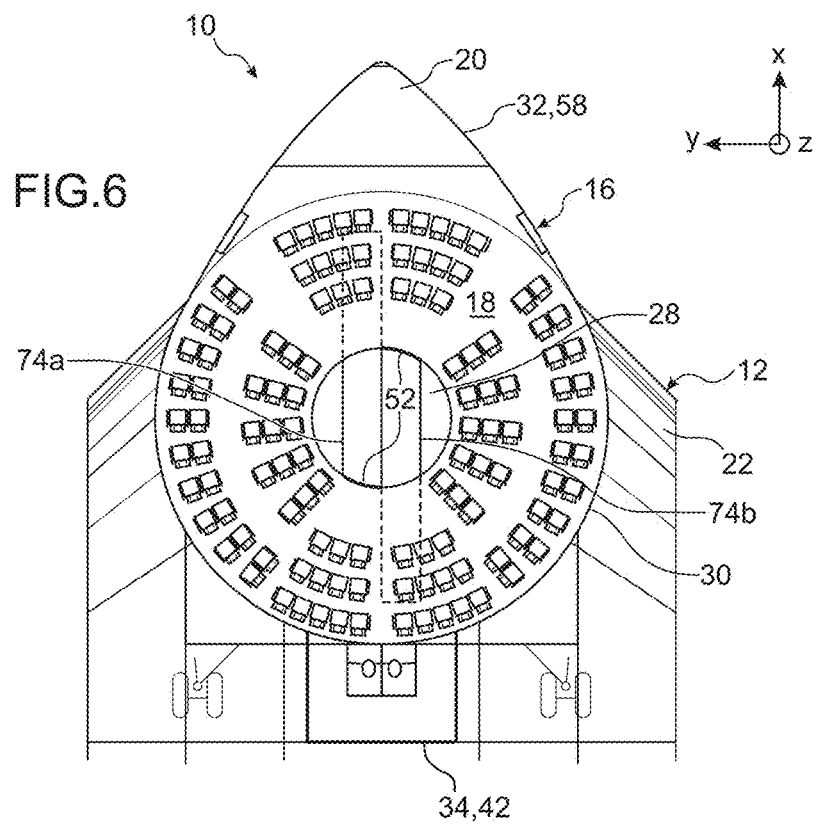
FIG. 6 is a view similar to that in FIG. 1a showing the embarking and disembarking method in FIG. 5.

FIGS. 5 and 6 diagrammatically show a first method of embarking passengers onboard the aircraft 10 and disembarking passengers from this aircraft 10.

For application of this method, the aircraft is preferably located on a parking area 68 under which there is a room 70 for passenger transit.

The floor of the parking area 68 comprises at least one and preferably two doors 72a, 72b. The room 70 comprises at least one and preferably two retractable escalators 74a, 74b, shown very diagrammatically. These escalators are preferably parallel to each other and adjacent.

When embarking, one 72a of the openings in the floor of the parking area 68 is open, and the access hatch 56 of the aircraft 10 is also open. The corresponding escalator 74a is extended through the door 72a and through the access hatch 56 so as to penetrate into the space 28 until reaching one of the inside doors 52 of the structure 16 delimiting the passenger cabin 18. Departing passengers can thus get on the aircraft using the escalator 74a.

Similarly when disembarking, the other 72b of the doors in the floor of the parking area 68 is open, and the access hatch 56 of the aircraft 10 is also open. The corresponding escalator 74b is extended through the door 72b and through the access hatch 56 so as to penetrate into the space 28 until reaching the other of the inside doors 52 of the structure 16 delimiting the passenger cabin 18. Arriving passengers can thus leave the aircraft using the escalator 74b.

Embarking and disembarking can advantageously take place simultaneously as shown in FIGS. 5 and 6.

Since the aircraft is accessed through the inside doors 52, the outside doors 54 can be reserved for the evacuation of passengers in case of emergency.

Figure 7:
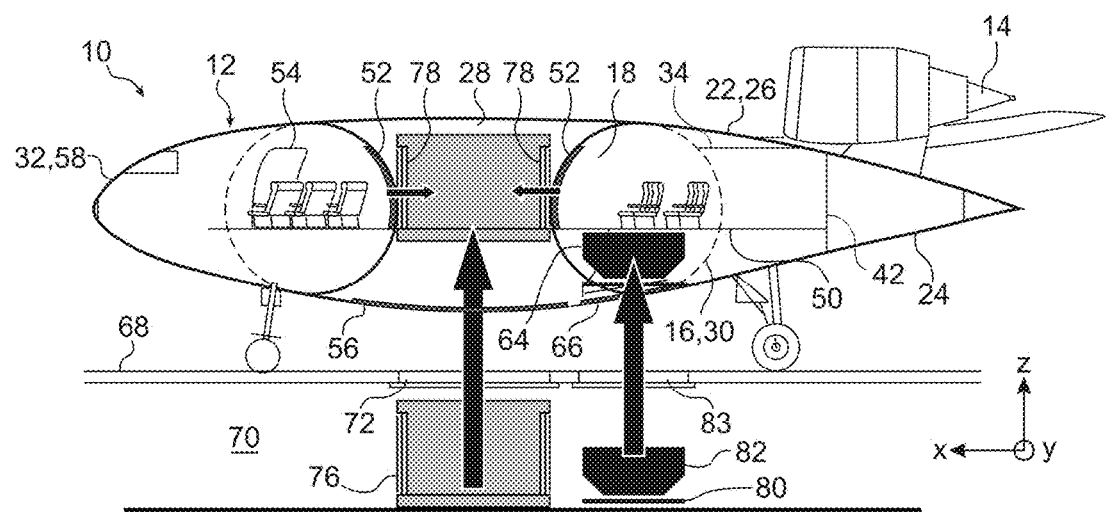
FIG. 7 is a view similar to FIG. 5, showing a second passenger embarking and disembarking method and a baggage and/or freight loading and unloading method.

FIG. 7 shows a second method of embarking passengers onboard the aircraft 10 and disembarking passengers from this aircraft.

This method is based on the use of an elevator to transfer passengers. This transfer only requires a single door 72 in the floor of the parking area 68. As regards the elevator, only the cabin 76 thereof is shown in FIG. 7. The lifting mechanism of this cabin 76 may be conventional and it is not shown in FIG. 7 for reasons of clarity.

When passengers embark, they enter the elevator cabin 76 from the room 70 located under the parking area. The access hatch 56 of the aircraft 10 is open.

The elevator cabin 76 is then moved upwards through the door 72 and the access hatch 56 to reach the space 28 inside the aircraft 10. The elevator cabin is also shown in its position inside the aircraft, and is then referred to as reference 76'. Preferably, two doors 78 of the elevator cabin 76' open facing the two inside doors 52 of the aircraft, also in the open position to enable passengers to access the aircraft cabin 18.

Once embarking is complete, the elevator cabin can be loaded with luggage or freight and then stored in the space 28 to maximise the aircraft carrying capacity. Passengers can be evacuated in case of emergency through the outside doors 54.

Disembarking takes place in a similar manner, the order of operations simply being reversed.

A method of loading and unloading luggage and/or freight may be applied similarly, as is also shown in FIG. 7. This method uses a luggage elevator comprising a mobile platform 80.

Luggage and/or freight previously enclosed in a container 82 that is provided for this purpose can then be loaded by putting the container 82 on the mobile platform 80 and then moving this platform upwards though a door 83 provided in the floor of the parking area 68 and then through the door in the hold 66, these two doors 83 and 66 having previously been opened, until the container 82 penetrates into the hold 64 of the aircraft.

Unloading of luggage and/or freight takes place in a similar manner, the order of the operations once again being reversed.

Figure 8:
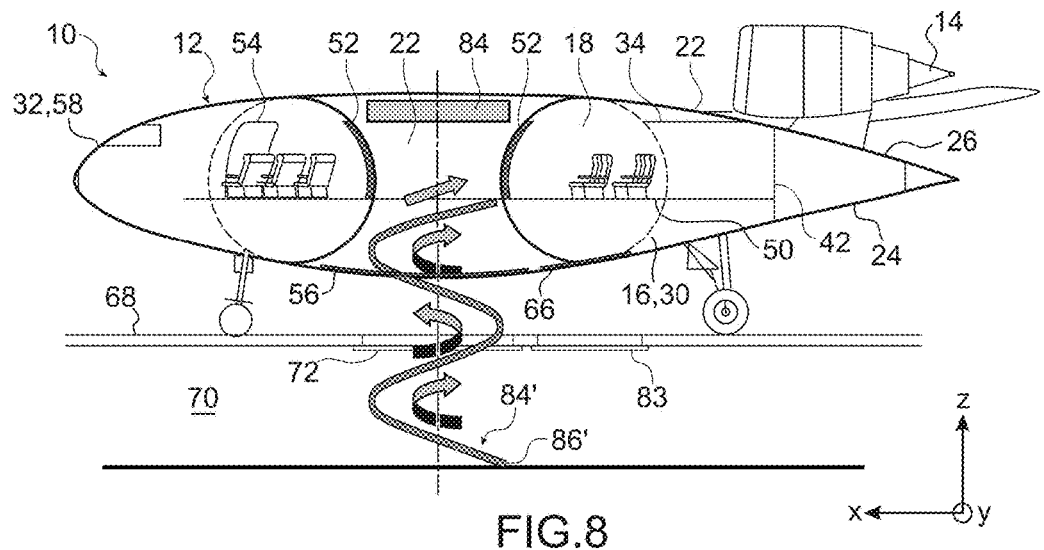
FIG. 8 is a view similar to FIG. 5, showing a third passenger embarking and disembarking method.

FIG. 8 shows a third method of embarking onboard the aircraft 10 and disembarking from this aircraft.

This method is based on the use of a retractable spiral staircase 84, that is preferably permanently housed in the space 28 inside the aircraft 10. Reference 84 in the FIG. 8 denotes the staircase shown in its retracted state in a storage position, for example suspended from the upper part 26 of the aerodynamic envelope 22.

When embarking and/or disembarking, the access hatch 56 of the aircraft and the door 72 in the floor of the parking area 68 are previously opened and the staircase is then extended downwards (reference 84' in FIG. 8) such that a lower end 86 of this staircase extends close to a floor of the room 70 located under the parking area 68.

Figure 9:
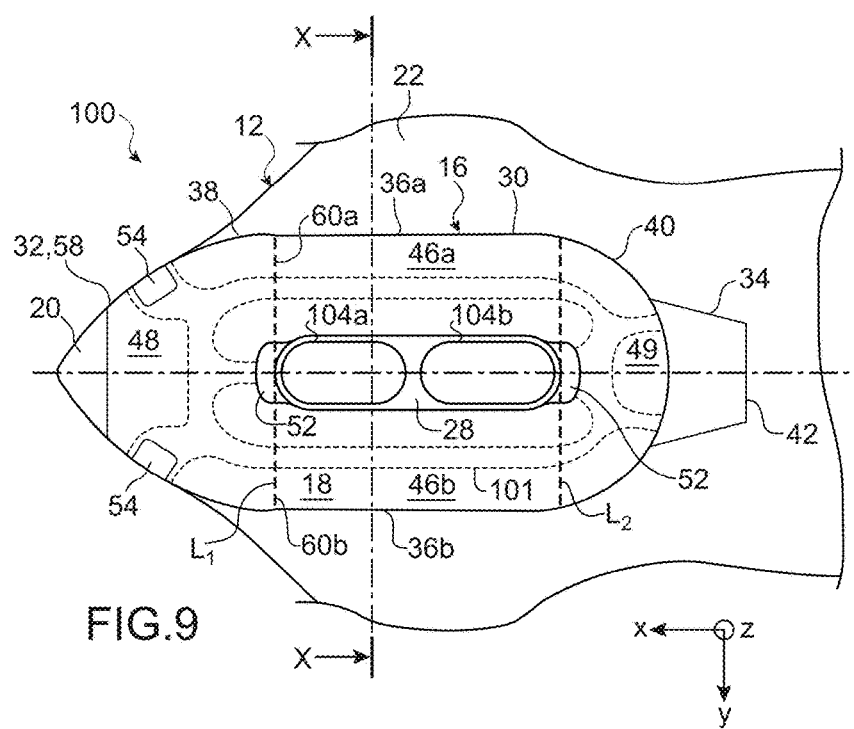
FIG. 9 is a partial diagrammatic top view of an aircraft according to a second embodiment of the invention.
Figure 10:
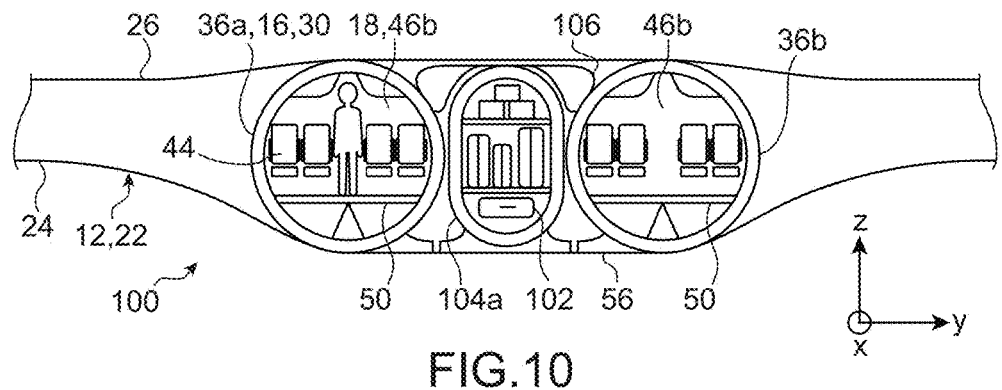
FIG. 10 is a partial diagrammatic sectional view of the aircraft in FIG. 9.

FIGS. 9 and 10 show an aircraft 100 according to a second embodiment of the invention also of the "flying wing" type. This aircraft is different from the aircraft in FIGS. 1 to 8 because the structure 16 delimiting the passenger cabin 18 is elongated in shape along the longitudinal direction X of the aircraft.

The structure 16 thus has a part 30 shaped like an "elongated torus" and is thus approximately in the form of a cylinder folded on itself. This part 30 once again extends forwards to form the nose cone 32 of the aircraft and in the aft direction to form the projection 34.

The space 28 surrounded by the part 30 is also elongated in shape along the longitudinal direction X.

There is only one space 28 in the example shown, but as a variant several spaces can be provided one after the other along the longitudinal direction and separated from each other by partitions or by transverse portions of the passenger cabin 18.

FIG. 9 also shows a particular configuration of corridors 101 formed inside the cabin 18 for circulation of passengers and access to the inside doors 52 and outside doors 54.

As shown in FIG. 10, the aircraft 100 does not have a hold under the floor 50 of the passenger cabin 18. The aircraft is thus remarkably thin, in other words its extent along the direction of the height Z is particularly reduced (FIG. 10), which improves the aerodynamic properties of the aircraft.

FIGS. 9 and 10 show a particular method of using the aircraft 100 in which the space 28 is advantageously used to contain luggage and/or freight.

To achieve this, the luggage and/or freight 102 (FIG. 10) are for example located in two containers 104a and 104b (FIGS. 9 and 10) arranged one behind the other within the space 28. For example, each of these containers has an oblong shaped section along a direction corresponding to the direction of the height Z when the container is in its loading position within the space 28 (FIG. 10). In the example shown, each of the containers also has an oblong section along the longitudinal direction X (FIG. 9). Each of the containers may be held in position by any appropriate means. Each of these containers preferably comprises its own pressurisation means which are advantageously designed to pressurise containers at a pressure less than the pressure in the passenger cabin during flight, but sufficient for the transport of luggage and freight. The pressurisation means in each container may for example be in the form of a pressurised air cylinder connected to the container during flight, or a simple connector for connection to a pressurisation unit on the ground.

Transport of luggage and/or freight 102 within the space 28 is compatible with the loading and unloading methods described above. It is sufficient to put the containers 104a, 104b into place after passengers have finished embarking and the space 28 is released, and then to unload the containers before starting to disembark passengers. Note that in case of emergency, the passengers can access the external doors 54 at any time to evacuate the aircraft.

As a variant, the external doors 54 as well as the internal doors 52 can be used to accelerate embarking or disembarking of passengers.

Furthermore, FIG. 10 very diagrammatically shows the use of the space 28 to route aircraft ancillaries 106 in the space 28, for example on each side of containers 104a, 104b.

Figure 11:
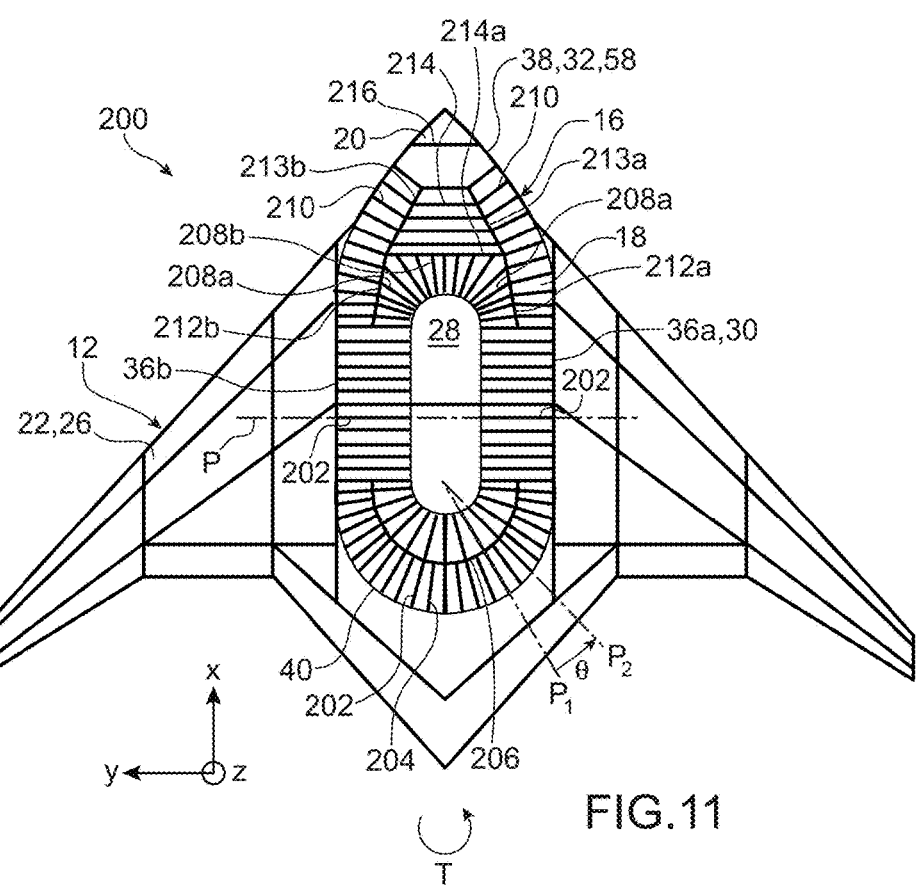
FIG. 11 is a partial diagrammatic top view of an aircraft according to a third embodiment of the invention.

FIG. 11 shows an aircraft 200 according to a third embodiment of the invention which is much the same type as the aircraft 100 described above except that the structure 16 delimiting the passenger cabin has no aft projection.

As shown particularly in FIG. 11, the structure 16 includes a set of stiffening frames.

More precisely, a median part of each of the lateral portions 36a, 36b of the structure 16 includes a plurality of circumferential stiffening frames 202 located one after the other along the longitudinal direction X of the aircraft. Each of these circumferential frames thus lies in plane P orthogonal to the longitudinal direction X.

Furthermore, the aft portion 40 of the structure 16 and an aft portion of each of the lateral portions 36a and 36b include an alternation of circumferential stiffening frames 202 and half-stiffening frames 204. These half stiffening frames are approximately in the form of a semi-circle with two circumferential ends connected to an upper stiffening arc 206 and a lower stiffening arc respectively (not shown in the figure). The half-frames 204 are located on the external side outside the above-mentioned two stiffening arcs.

The forward portion 38 of the structure 16 and a forward part of each of the lateral portions 36a and 36b for example integrate a plurality of stiffening inner half-frames 208a, 208b and external half-frames 210 similar to the half frames 204, and beams 212a, 212b, 213a, 213b, transverse stiffeners 214, 214a, and a circumferential frame 216.

The inner half-frames 208a, 208b are arranged to the inside of the structure 16, in other words on the side of the space 28. The circumferential ends of the first inner half-frames 208a are connected to a corresponding upper beam 212a, 212b and a first corresponding lower beam (not shown in the figure) respectively. The circumferential ends of the second inner half-frames 208b are connected to an upper transverse stiffener 214a and a lower transverse stiffener (not shown in the figure) respectively.

The outer half-frames 210 are placed to the outside of the aircraft 200. The circumferential ends of these outer half-frames 210 are connected to beams 212a, 212b, 213a, 213b respectively.

Each of the transverse stiffeners 214, 214a have two opposite ends connected to beams 213a, 213b respectively.

For reasons of clarity, virtual lines separating the lateral portions of the forward and aft portions of the structure 16 cannot be seen in FIG. 11.

In general, integration of circumferential frames into the structure 16 makes it possible to get the best advantages due to the presence of the space 28 in terms of resistance to pressurisation loads.

In the example in FIG. 11, the aft portion 40 also benefits from the advantages resulting from the integration of circumferential frames.

Furthermore, the entire structure 16 benefits from the lack of any double curvature.

In particular, when the aircraft 200 is seen from above and the structure 16 is viewed along the anticlockwise direction T, plane P2 of each of the circumferential stiffening frames 202 defines a positive or zero anticlockwise angle θ with the plane P1 of the previous circumferential stiffening frame. Conventionally, the angle θ is the to be "zero" when planes P1 and P2 are parallel, as in the lateral portions 36a and 36b.

The configuration of stiffening frames described above may be adapted to the aircraft in FIGS. 9 and 10, in which case some frames and half-frames in the aft portions 40 may be split into two to form the forward opening of the projection 34.

Figure 12:
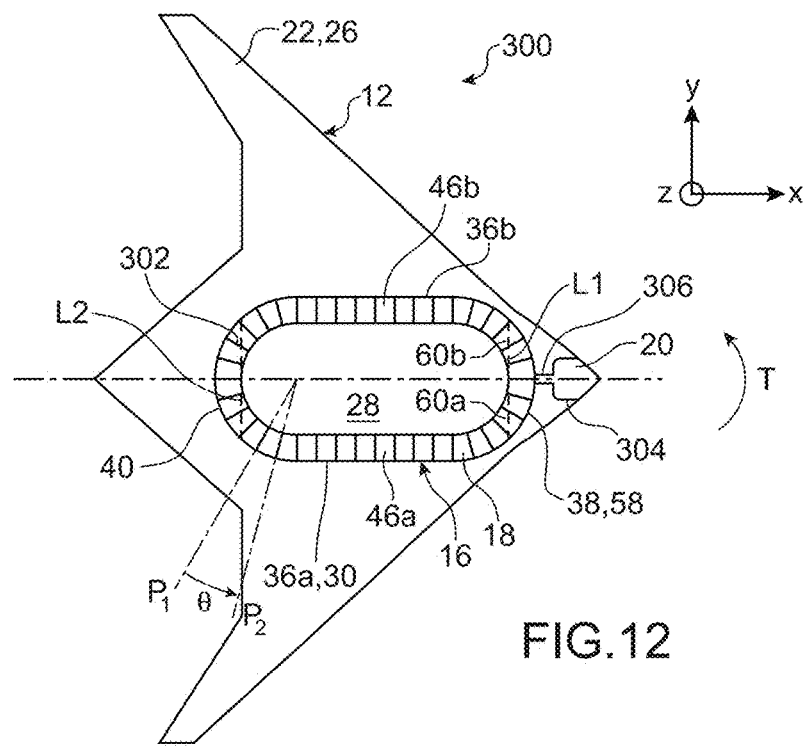
FIG. 12 is a partial diagrammatic top view of an aircraft according to a fourth embodiment of the invention.

FIG. 12 very diagrammatically shows an aircraft 300 according to a fourth embodiment of the invention that is similar to the aircraft 200 in FIG. 11, but for which the structure 16 delimiting the passenger cabin is simplified.

The structure 16 according to this embodiment comprises circumferential frames 302 distributed along this entire structure 16 in other words in the lateral portions 36a, 36b, in the forward portion 38 and in the aft portion 40. In particular, the structure 16 does not have any half-frames as described above with reference to FIG. 11.

It is remarkable when the aircraft 300 is seen from above and the structure 16 is viewed following the anticlockwise direction T, the plane P2 of each of the circumferential stiffening frames 202 defines a positive or zero anticlockwise angle θ with the plane P1 of the previous circumferential stiffening frame. Therefore this property is valid in the lateral portions 36a, 36b, in the forward portion 38 and in the aft portion 40. Once again, the angle θ is the to be "zero" when the planes P1 and P2 are parallel, as in the lateral portions 36a and 36b.

In this embodiment, the cockpit 20 is formed in a projection 304 connected to the forward portion 38 of the structure 16 through a relatively narrow corridor 306.

In this way, the shape of the structure 16 may be as close as possible to the shape of a more or less elongated torus, which optimises resistance of this structure 16 to pressurisation loads.

Figure 13:
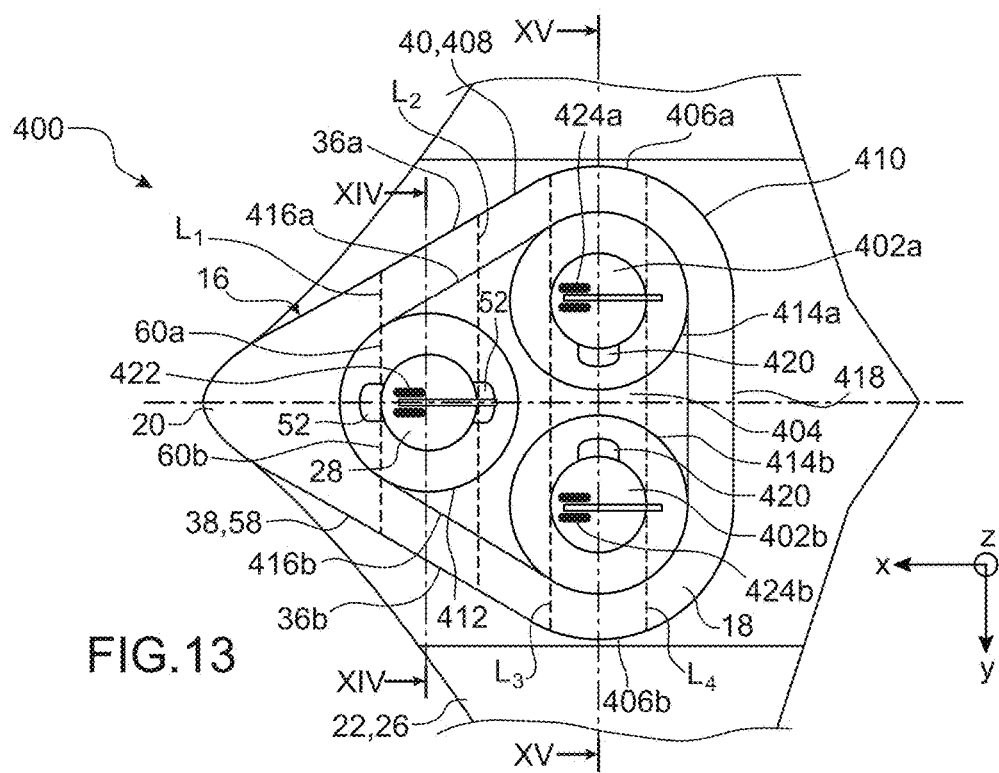
FIG. 13 is a partial diagrammatic top view of an aircraft according to a fifth embodiment of the invention.
Figure 14:
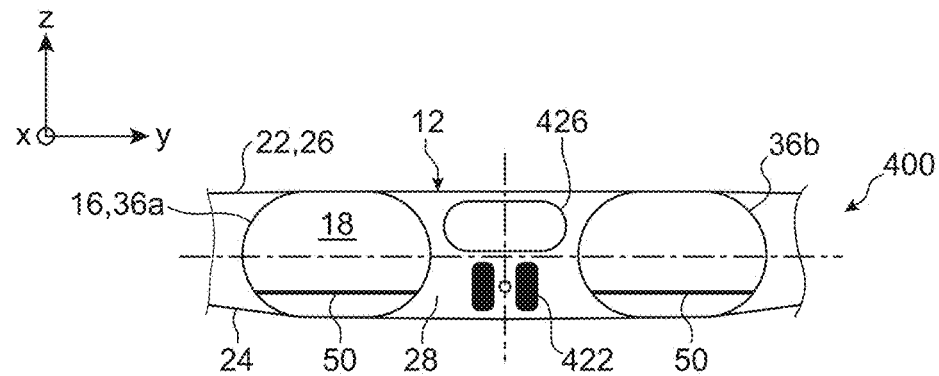
FIG. 14 is a partial diagrammatic sectional view of the aircraft in FIG. 13 along plane XIV-XIV in FIG. 13.
Figure 15:
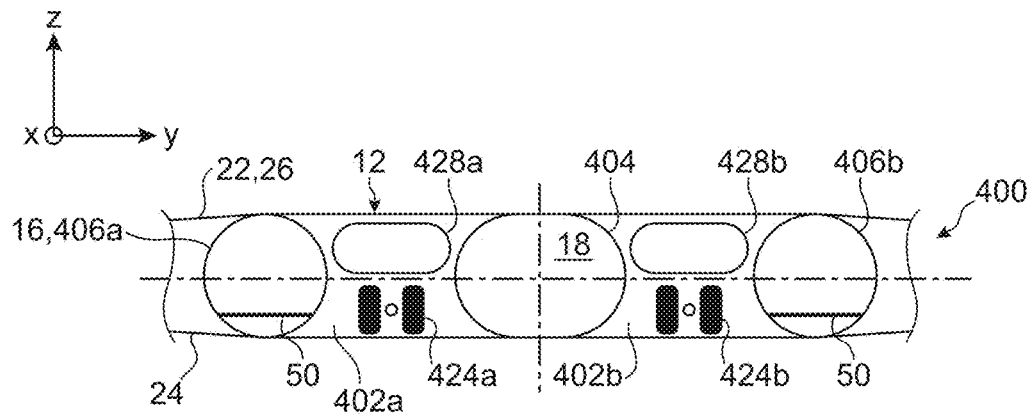
FIG. 15 is a partial diagrammatic sectional view of the aircraft in FIG. 13 along plane XV-XV in FIG. 13.

FIGS. 13 to 15 very diagrammatically show an aircraft 400 according to a fifth embodiment of the invention in which the structure 16 delimiting the passenger cabin 18 is globally triangular in shape when it is seen from above and defines three spaces 28, 402a and 402b each of which is outside the structure 16 and is surrounded by this structure 16 around 360 degrees.

Thus, the structure 16 comprises the forward portion 38, particularly including the cockpit 20, the two lateral portions 36a and 36b being arranged on each side of the pace 28, and the aft portion 40 defined behind the space 28.

Therefore the aircraft 400 is different from the aircraft described above with reference to FIGS. 1 to 12 in that the aft portion 40 of the structure 16 itself comprises a median portion 404 and two lateral portions 406a and 406b located on each side of the median portion 404 so as to define the other two spaces 402a, 402b outside the structure 16 (FIG. 13). These other two spaces 402a, 402b extend respectively between the median portion 404 and the two lateral portions 406a and 406b of the aft portion 40 and are each delimited by the lower and upper parts 24 and 26 of the aerodynamic envelope 22, as is the space 28.

As shown in FIG. 13, the aft portion 40 of the structure 16 also comprises a forward portion 408 defined forward from a transverse line L3 tangent to a forward end of each of the spaces 402a and 402b, and an aft portion 410 defined behind a transverse line L4 tangent to an aft end of each of the spaces 402a and 402b.

The structure 16 is stiffened by circumferential frames, half-frames and lower and upper stiffeners. Only the main stiffeners among the stiffening elements can be seen in FIG. 13, for reasons of clarity. Thus, three annular upper stiffeners 412, 414a and 414b are shown extending along the corresponding axes of the spaces 28, 402a and 402b respectively, and three straight upper stiffeners 416a, 416b and 418 connecting the upper annular stiffeners 412, 414a and 414b together. The structure 16 also comprises three annular lower stiffeners and three straight lower stiffeners arranged in a similar manner (not shown in FIG. 13). The structure 16 comprises in particular a plurality of half-frames around each of the spaces 28, 402a, 402b extending in the radial planes relative to the axis of the corresponding space and connected to the corresponding lower and upper annular stiffeners.

In addition to the internal doors 52 opening up in the space 28, the structure 16 preferably includes internal doors 420 opening up in spaces 402a and 402b respectively.

Furthermore, the structure delimiting the passenger cabin in conventional aircraft usually comprises geometric discontinuities necessary for the integration of structural equipment and/or connections. These geometric discontinuities reduce the natural strength of the structure for resisting pressurisation loads and make it necessary to increase the mass of the structure and/or use stronger materials. A landing gear compartment is an example of a geometric discontinuity formed in the structure delimiting a passenger cabin. In the special case of aircraft, the central wing box connecting the wings to the fuselage forms an example of a structural connection forming such a geometric discontinuity.

As can be seen in FIGS. 13 to 15, the three spaces 28, 402a and 402b are advantageously used to house a forward landing gear 422 and two aft landing gears 424a and 424b.

Thus, the landing gear compartment does not induce any geometric irregularity in the structure 16.

This characteristic is compatible with use of spaces 28, 402a and 402b for passengers and/or luggage or freight to pass through while embarking and disembarking, particularly because these operations are done when each landing is extended and therefore does not occupy the above mentioned spaces. Furthermore, when in the retracted position, landing gear can leave part of each of the spaces 28, 402a and 402b free to hold luggage and/or freight as shown by the presence of containers 426, 428a and 428b in FIGS. 14 and 15.

The embodiments described above are related to flying wings. This type of aircraft has many advantages particularly in terms of aerodynamic, mass and carrying capacity properties, and due to the lack of a central wing box and therefore the absence of an associated geometric discontinuity within the pressurised structure.

As explained above, the invention can take advantage of the large internal volume of a flying wing without reducing the resistance to pressurisation loads.

Figure 16:
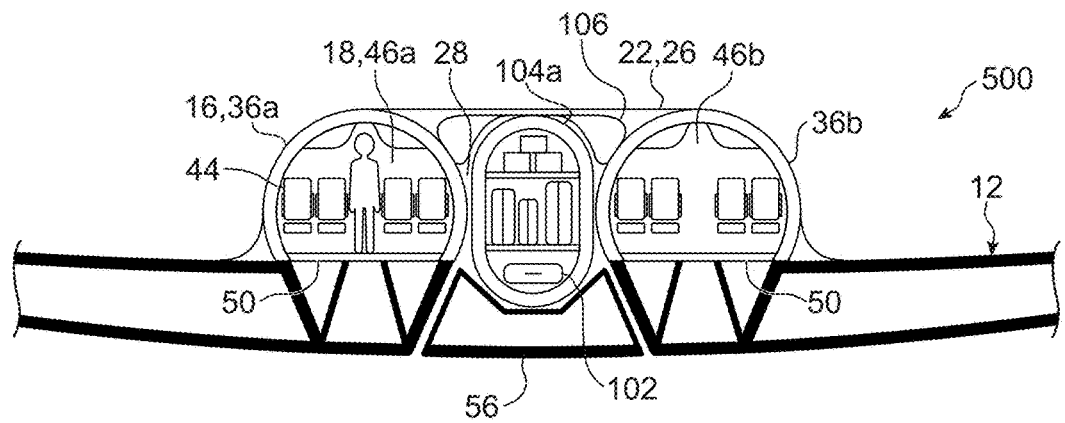
FIG. 16 is a partial diagrammatic cross-sectional view of an aircraft according to a sixth embodiment of the invention.

However, as shown in FIG. 16, the invention is not limited to "flying wing" type aircraft but can also be used for airplanes. Thus, FIG. 16 shows an aircraft 500 according to a sixth embodiment of the invention, in the form of airplane in which the structure 16 delimiting the passenger cabin 18 and the cockpit 20 is no longer integrated into the wing 12, but is arranged above the wing 12.

In the particular example shown, the structure 16 is similar to the structure of the aircraft 100 in FIGS. 9 and 10, and the wing is in the form of a delta wing.

After reading the above, those skilled in the art will understood that the transverse section of the structure 16, although preferably being approximately circular, can be otherwise without going outside the scope of the invention.

Furthermore, as shown by the diversity of the embodiments disclosed above, different global geometries of the structure 16 are possible within the framework of the invention. In particular, the structure 16 may be generally toroidal in shape or elongated along the longitudinal direction X or elongated along the transverse direction Y.

The invention claimed is:

1. An aircraft comprising a structure having a substantially continuous passenger cabin, wherein, when the structure is seen from above, the structure comprises:
    at least two lateral portions respectively comprising two lateral regions of the substantially continuous passenger cabin and separated from each other by a space defined outside the structure and extending between substantially solid lower and upper parts of an aerodynamic envelope externally delimiting the aircraft;
    a forward portion connecting two forward ends of the lateral portions of the structure to each other; and
    an aft portion connecting two aft ends of the lateral portions of the structure to each other,
    wherein the at least two lateral portions, the forward portion, and the aft portion comprise the substantially continuous passenger cabin, and
    wherein the aircraft comprises a propulsion system located external to the aerodynamic envelope of the aircraft.

2. The aircraft according to claim 1, wherein, when the structure is seen from above, the forward portion of the structure has an outside edge that is concave from a first end of the forward portion as far as a second end of the forward portion opposite the first end, with a concave face of the outside edge facing an aft side of the aircraft.

3. The aircraft according to claim 1, wherein the aft portion comprises one median section and two lateral sections arranged on respective sides of the median section to define second and third spaces outside the structure, these second and third spaces extending between the median section and the lateral sections of the aft portion, each being delimited by the lower and upper parts of the aerodynamic envelope.

4. The aircraft according to claim 1, wherein the aerodynamic envelope comprises at least one access hatch for accessing the space.

5. The aircraft according to claim 4, further comprising a removable container housed inside the space.

6. The aircraft according to claim 4, further comprising a landing gear housed in the space.

7. The aircraft according to claim 4, wherein the structure comprises at least one internal door for accessing the space.

8. A method for embarking or disembarking passengers onto or off of the aircraft according to claim 7, the method comprising extending a passenger passage through the access hatch of the aerodynamic envelope, through the space, and through the at least one internal door of the structure.

9. The aircraft according to claim 1, wherein each of the at least two lateral portions of the structure comprises a plurality of circumferential stiffening frames.

10. The aircraft according to claim 9, wherein each of the forward and aft portions comprises a plurality of circumferential stiffening frames.

11. The aircraft according to claim 10, wherein the circumferential stiffening frames of the at least two lateral portions and of the forward and aft portions are disposed in corresponding planes and arranged such that when the structure is seen from above with respect to an anticlockwise direction, a plane of each circumferential stiffening frame defines a positive or zero anticlockwise angle with respect to a plane of an immediately preceding circumferential stiffening frame in a clockwise direction.

* * * * *